US012614311B2

(12) United States Patent     (10) Patent No.:   US 12,614,311 B2

Pelc et al.     (45) Date of Patent:    Apr. 28, 2026

(54) AUTONOMOUS STEREO CAMERA CALIBRATION

(71) Applicant: REALSENSE, INC., Santa Clara, CA (US)

(72) Inventors: Oskar Pelc, Netanya (IL); Dmitry Rudoy, Haifa (IL); Noam Levy, Karmiel (IL)

(73) Assignee: REALSENSE, INC.

( * ) Notice: Subject to any disclaimer, the term of this patent is extended or adjusted under 35 U.S.C. 154(b) by 720 days.

(21) Appl. No.: 17/845,652

(22) Filed: Jun. 21, 2022

(65) Prior Publication Data

US 2022/0398780 A1    Dec. 15, 2022

(51) Int. Cl.
    G06T 7/80     (2017.01)
    G06T 7/593     (2017.01)

(52) U.S. Cl.
    CPC ............... G06T 7/85 (2017.01); G06T 7/593 (2017.01); *G06T 2207/10012* (2013.01)

(58) Field of Classification Search
    CPC . G06T 2207/10012; G06T 2207/10021; G06T 2207/10024; G06T 2207/10048; G06T 2207/20076; G06T 2207/20081; G06T 2207/20084; G06T 7/593; G06T 7/85
    See application file for complete search history.

(56) References Cited

U.S. PATENT DOCUMENTS 11,270,467 B2 *   3/2022   Devitt .................... G06T 1/0007
2016/0084642 A1 *   3/2016   Bradski ..................... G06T 7/55
                               348/136
2019/0269223 A1 *   9/2019   Harding ............... G06V 40/171
2020/0324781 A1 *   10/2020   Hayakawa ................ G06T 7/73
2021/0327092 A1 *   10/2021   Jiang ..................... B60W 40/02
2022/0398780 A1 *   12/2022   Pelc .......................... G06T 7/85

OTHER PUBLICATIONS

Von der Fakult"at et al. ,"The Robust 3-D Sceneflow," Sep. 9, 2008, Electrical Engineering and Computer Sciences Technische Universit"at Berlin, Berlin 2009, pp. 16-40, 111-140.*

Meng Ding et al., "Vision-Based Distance Measurement in Advanced Driving Assistance Systems," Oct. 17, 2020,Appl. Sci. 2020, 10, 7276, pp. 1-17.*

Brian O'Kennedy, "Stereo Camera Calibration,"Dec. 2002, Thesis, Electronic Engineering degree at the University of Stellenbosch,pp. 7-16 and 36-70.*

Alexander Chiu,"Probabilistic Outlier Removal for Stereo Visual Odometry," Mar. 2017, Dissertation, Stellenbosch: Stellenbosch University, 2017,pp. 2-19 and 81-88.*

* cited by examiner

*Primary Examiner* — Omar S Ismail

(74) *Attorney, Agent, or Firm* — S.J. INTELLECTUAL PROPERTY LTD.

(57)            ABSTRACT

Methods, apparatus, systems, and articles of manufacture are disclosed to calibrate a stereo camera. An example apparatus includes means for determining a motion grid between a first image and a second image captured by the stereo camera; means for determining a calibration value to calibrate the stereo camera based on a prior calibration value, a relative orientation between the first image and the second image based on the motion grid, and a metric indicative of calibration improvement; and means for estimating a depth based on the calibration value.

25 Claims, 10 Drawing Sheets

R=[RX,RY,RZ]
ROTATION MATRIX

CONSTRAINT:
X1'F*X2 = O
F= "FUNDAMENTAL MATRIX"

EPIPOLAR
LINE FOR X

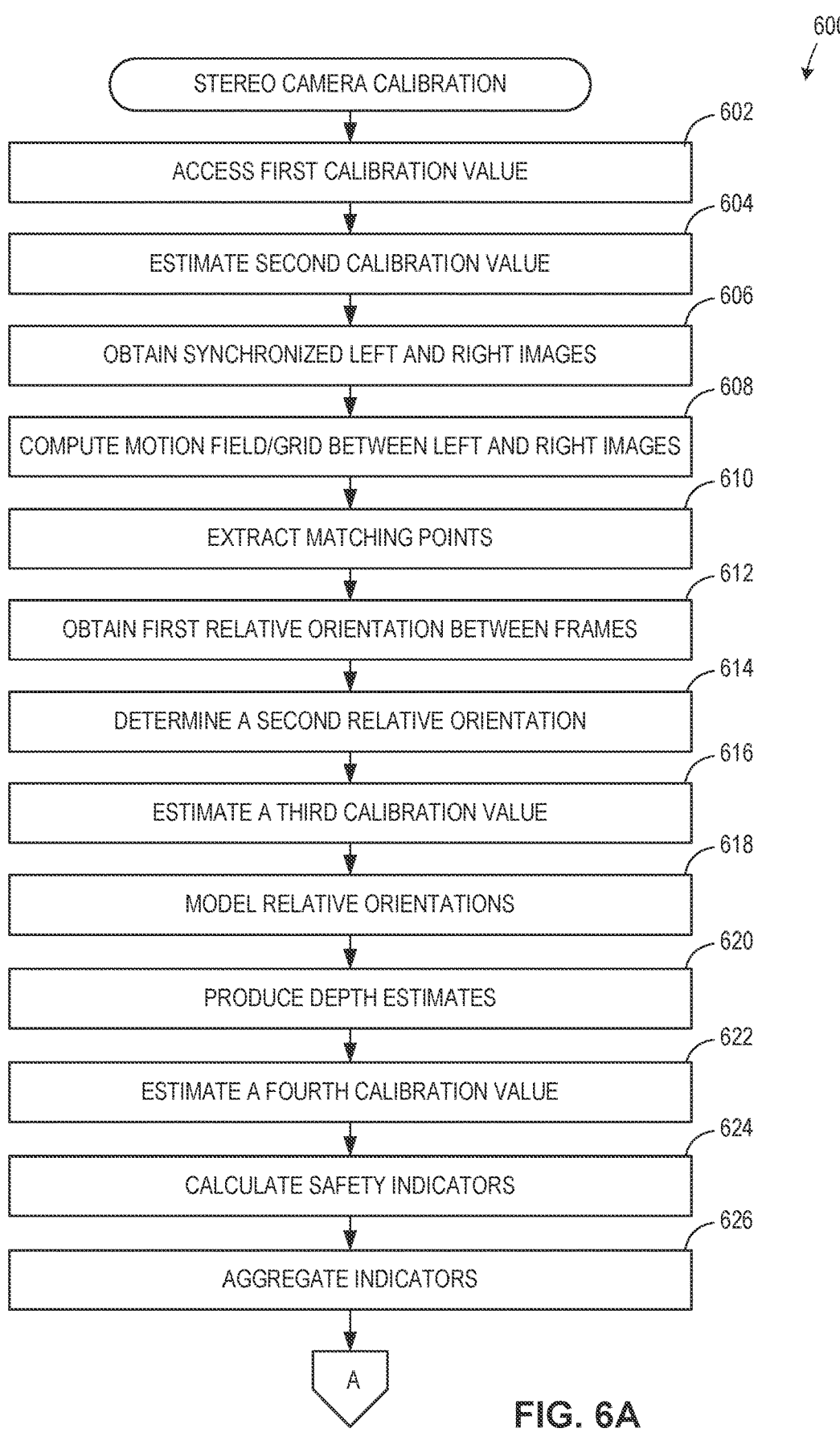

600

STEREO CAMERA CALIBRATION

602

ACCESS FIRST CALIBRATION VALUE

604

ESTIMATE SECOND CALIBRATION VALUE

606

OBTAIN SYNCHRONIZED LEFT AND RIGHT IMAGES

608

COMPUTE MOTION FIELD/GRID BETWEEN LEFT AND RIGHT IMAGES

610

EXTRACT MATCHING POINTS

612

OBTAIN FIRST RELATIVE ORIENTATION BETWEEN FRAMES

614

DETERMINE A SECOND RELATIVE ORIENTATION

616

ESTIMATE A THIRD CALIBRATION VALUE

618

MODEL RELATIVE ORIENTATIONS

620

PRODUCE DEPTH ESTIMATES

622

ESTIMATE A FOURTH CALIBRATION VALUE

624

CALCULATE SAFETY INDICATORS

626

AGGREGATE INDICATORS

STEREO CAMERA CALIBRATION

702

DETERMINE MOTION GRID

704

ACCESS PRIOR CALIBRATION VALUE

706

DETERMINE RELATIVE ORIENTATION BETWEEN THE FIRST IMAGE AND THE SECOND IMAGE

708

DETERMINE SAFETY METRIC

710

DETERMINE A CALIBRATION VALUE

712

ESTIMATE DEPTH

END

AUTONOMOUS STEREO CAMERA CALIBRATION

FIELD OF THE DISCLOSURE

This disclosure relates generally to sensor calibration and, more particularly, to autonomous stereo camera calibration.

BACKGROUND

Stereo cameras are cameras that include two or more lenses that have respective image sensors. Stereo cameras may be used to estimate depth of objects in scene or an image. Stereo cameras may be sensitive to mechanical and thermal variations of the relative positions of the individual cameras. Thus, stereo cameras require occasional re-calibration.

BRIEF DESCRIPTION OF THE DRAWINGS

FIG. 6A and FIG. 6B, taken together, form a flowchart representative of example machine readable instructions and/or example operations that may be executed and/or implemented by example processor circuitry to implement the example calibration system of FIG. 1.

In general, the same reference numbers will be used throughout the drawing(s) and accompanying written description to refer to the same or like parts. The figures are not to scale.

DETAILED DESCRIPTION

Figure 1:
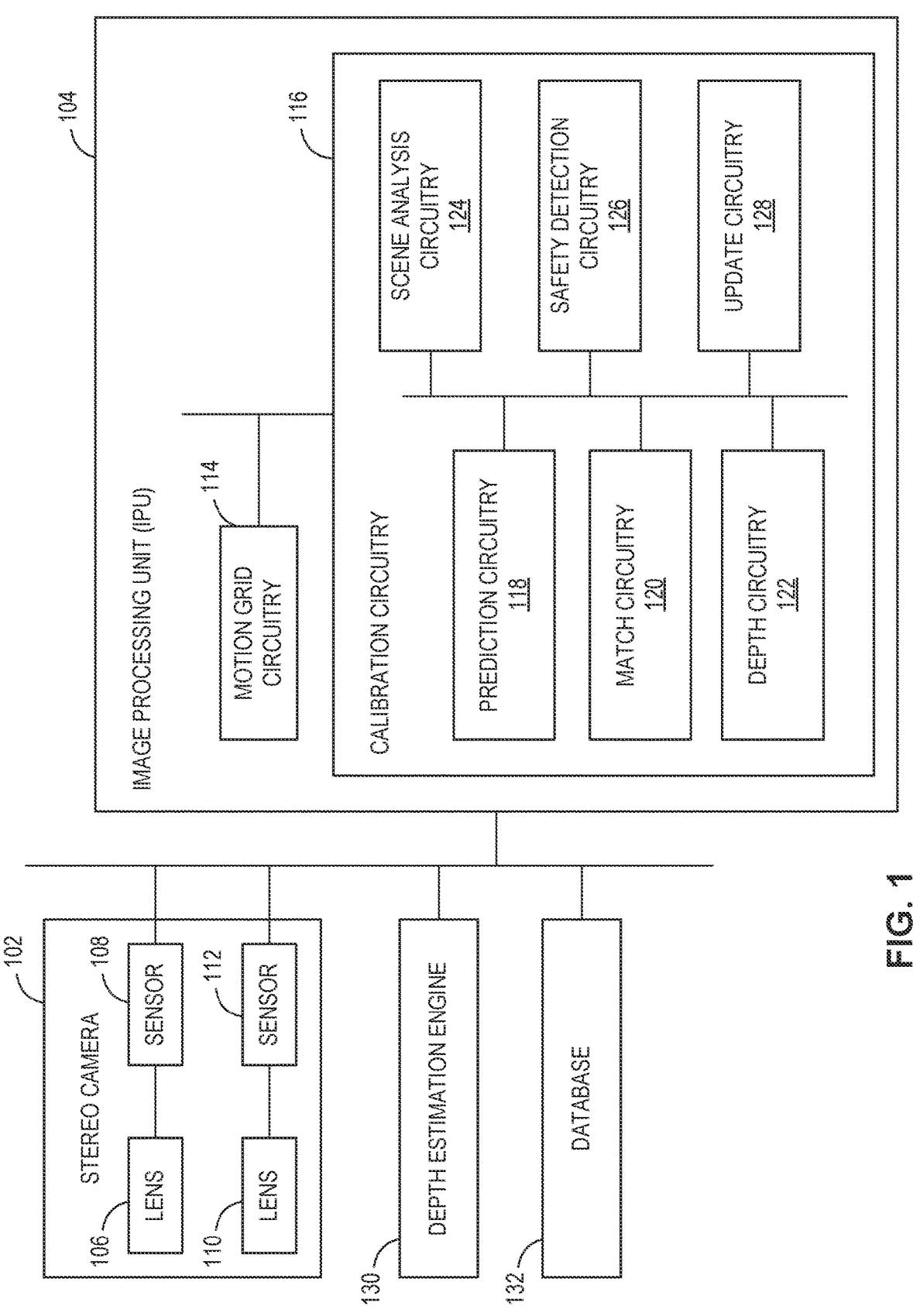
FIG. 1 is a block diagram of an example calibration system constructed in accordance with teachings of this disclosure.

Stereo image sensing technologies use two cameras to calculate depth and enable devices to see, understand, interact with, and learn from their environment. Depth of objects in a scene or image can be used in many applications including, for example, robotics, scanning, measurements, tracking, and facial authentication. Depth image quality or depth quality is an evaluation of the depth of objects in an image quantitatively (e.g., using predefined metrics) and/or qualitatively (e.g., using visual cues). Because stereo cameras may be sensitive to mechanical and thermal variations of the relative positions of the individual cameras, depth quality deterioration may occur over time. Some conventional techniques for addressing depth quality deterioration include periodic recalibration of the stereo camera. Typical recalibration includes taking the camera offline, placing a specific calibration target in front of the camera, and running special calibration software. While such a process can be performed in the lab or in the field, it usually involves human interaction. Other solutions include attempting to estimate the joint pose of the two cameras 'in the wild' (meaning, without a specific target or procedure). However, these methods are based on noisy measurements, and therefore, they may also deteriorate the quality of the camera calibration.

Disclosed herein are systems, apparatus, methods, and articles of manufacture for autonomous stereo camera calibrations. Examples disclosed herein include online, autonomous stereo calibration that requires little, if any, human interaction. As used herein, "human interaction(s)" is defined to mean that someone initiate(s) and/or conducts an action (e.g., a calibration procedure). In examples disclosed herein, because the calibration is performed automatically and without taking the camera offline, the usual operation of the camera does not need to be stopped.

In some examples, the automatic calibration of a stereo camera includes finding corresponding matching features between the left and right images. Also, in some examples, the automatic calibration of a stereo camera includes finding relative motion between the left and right images and/or features in the images. The matches are processed and used to refine stereo camera calibration parameters, consequently improving the depth estimation quality. Thus, examples disclosed herein maintain calibration of a stereo camera, without interfering with its normal operation. This creates better user experience and makes the camera maintenance easier and less expensive.

Examples disclosed herein also include a trained robustness estimation that uses different features of the camera and the calibration process to decrease the risk of a false or bad calibration correction to a manageable level.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

FIG. 1 is a block diagram of an example calibration system 100. The example calibration system 100 includes an example stereo camera 102 and an example image processing unit (IPU) 104. The example IPU 104 also may be known as an image processor, an image processing engine, and/or an image signal processor (ISP). The IPU 104 is a type of processor circuitry (e.g., a digital signal processor (DSP)) used for image processing such as, for example, in digital cameras or other devices. In other examples, the IPU 104 may be implemented by one or more other type(s) of processors and/or software emulating a processor.

The stereo camera 102 includes an example first lens 106 and corresponding example first sensor 108. The stereo camera 102 includes an example second lens 110 and corresponding example second sensor 112. The first sensor 108 and the second sensor 112 are collectively referred to as a stereo pair of sensors 108, 112. In some examples, the stereo camera 102 may include additional lenses and/or sensors. In some examples, the stereo camera 102 includes RGB sensors and/or infrared sensors. In some examples, the stereo camera 102 includes rolling shutters and/or a global shutter. The stereo camera 102 captures three-dimensional images and may be operable indoors, outdoors, and/or with fast moving subjects and/or environments. The illustrated example stereo pair of sensors 108, 112 are mechanically robust and may possibly have small variations.

Figure 2:
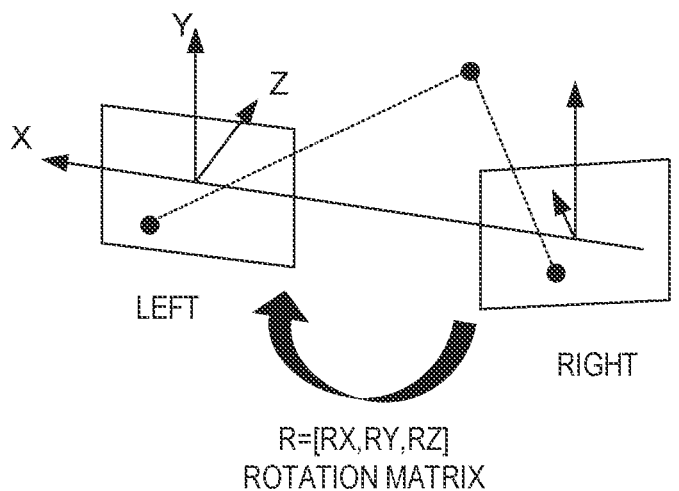
FIG. 2 is an illustration of an example coordinate relationship of an example stereo pair of sensors.

FIG. 2 is an illustration of an example coordinate relationship of the example stereo pair of sensors 108, 112. In the example of FIG. 2, the stereo pair of sensors 108, 112 is facing the same direction. The stereo pair of sensors 108, 112 provides synchronized left and right raw images. FIG. 2 shows a left image plane and a right image plane. A coordinate system is defined for each camera with horizontal x-axis, vertical y-axis and z-axis being perpendicular to the respective image plane. A rotation matrix R between the right and left sensors is defined.

The IPU 104 of the example of FIG. 1 includes example motion grid circuitry 114 and example calibration circuitry 116. The example calibration circuitry includes example prediction circuitry 118, example match circuitry 120, example depth circuitry 122, example scene analysis circuitry 124, example safety detection circuitry 126, and example update circuitry 128. The example system 100 also includes an example depth estimation engine 130 and an example database 132.

The example prediction circuitry 118 receives, obtains, and/or otherwise accesses a first calibration value, which also may be a previous calibration value. In some examples, the first calibration value may be, for example, a calibration value established during manufacturing and/or installation of the stereo camera 102. In some examples, the first calibration value is a calibration value established after completion of a prior example autonomous calibration process as disclosed herein.

The prediction circuitry 118 of the illustrated example performs a time series and signal processing analysis to temporally stabilize the calibration (the first calibration value). As used herein, "stabilizing a calibration" is defined to mean making the calibration more consistent over time. Stabilization of a calibration prevents the system from trying to produce different calibrations too quickly (e.g., too different of calibrations in consecutive frames), which increases the overall stability. In some examples, the prediction circuitry 118 uses a Kalman filter to stabilize the calibration. The prediction circuitry 118 maintains an inner state of the Kalman filter. An inner state of a Kalman filter is a set of variables maintained between each update. Maintenance of the inner state (e.g., set of variables) facilitates creation of a consistent dynamic model of the signal.

The prediction circuitry 118 uses the first calibration value, the Kalman filter, and updated inner state to establish or predict a second calibration value. A second calibration value also may be known as a preliminary calibration value.

The motion grid circuitry 114 obtains or accesses left and right images. The obtained images are synchronized (e.g., captured at substantially the same time). As used herein, substantially the same time is defined to mean sufficiently close to prevent the motion of the camera and/or objects in the scene from affecting the matching between the left and right images. In some examples, substantially the same time is on the order of a few milliseconds. The motion grid circuitry 114 computes a motion field or motion grid between the left and right images. A motion grid is a mapping of differences (e.g., motion) between corresponding x and y points in the left image and corresponding x and y points in the right image cause by the different viewpoints of the two cameras.

The match circuitry 120 extracts matching points between the left and right frames from the motion grid. Matching points are points in the left image and the right image representing the same point in three-dimensional space. In some examples, any set of matches can be used, not just sets that originate from or present in the motion grid. In other words, the match circuitry 120 is not limited to a regular grid of matches but can use any pattern.

Figure 3:
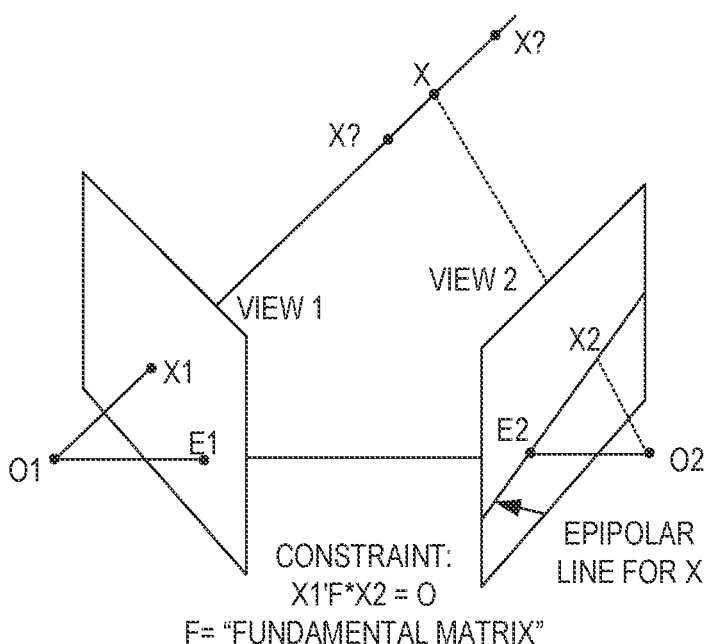
FIG. 3 is an illustration of example epipolar geometry of an example stereo pair of sensors.

The match circuitry 120 fits the matching points to the epipolar geometry model. FIG. 3 is an illustration of example epipolar geometry of an example stereo pair of sensors. FIG. 3 illustrates two cameras looking at point X. As shown in FIG. 3, a virtual image plane is placed in front of the focal center or optical center of each camera lens. Points O1 and O2 represent the centers of symmetry of the two cameras lenses, with O1 on the left and O2 on the right. X represents the point of interest. Points X1 and X2 are the projections of point X onto the respective image planes.

The optical centers of the first lens 106 and the second lens 110 project onto the other image plane. These two image points, denoted by E1 and E2, are called epipolar points. The epipolar points E1 and E2 and the respective optical centers O1, O2 lie on respective epipolar lines in their respective image planes. An epipolar line is a function of the position of point X in the three-dimensional space. A set of epipolar lines is generated in both image planes as the position of X changes or varies in space.

The epipolar geometry model also defines an epipolar plane. The epipolar plane is the plane formed by the points X, O1, and O2. The epipolar plane intersects each image plane at the epipolar lines.

For each point observed in one image plane, the same point must be observed in the other image plane on a known epipolar line. For example, with the projection point X1 and the epipolar line E2-X2 known, then the point X projects into the right image on a point X2, which must lie on this particular epipolar line. This is an epipolar constraint: the projection of X on the right image plane X2 must be contained in the E2-X2 epipolar line. With this constraint, it is possible to test if two points correspond to the same three-dimensional point. The epipolar constraint can be used to prune outliers, which are points in the motion grid that do not match between the left and right images.

Triangulation also may be used to calculate the position of X. With the points X1 and X2 known, their projection lines from the respective optical centers O1, O2 also are known. If the two image points correspond to the same three-dimensional point X, the projection lines intersect precisely at X. Thus, X can be calculated from the coordinates of the two image points.

The match circuitry 120 fits the matching points to the epipolar geometry model using the random sample consensus (RANSAC) method. The match circuitry 120 performs a limited number of random independent trials and accepts the model that agrees with most (e.g., a majority) of the matches. The result is a first relative orientation R=[Rx, Ry, Rz] between right and left frames. The relative rotation is reflected with the set "R" including three rotation angles (Rx, Ry, Rz) around three predefined x, y, z, axes.

The match circuitry 120 also refines the first relative orientation into a second relative orientation using bundle adjustment. The match circuitry 120 triangulates a three-dimensional location X from its projections X1, X2 (see FIG. 3). The match circuitry 120 reduces (e.g., minimizes) the reprojection error (an error while projecting X back to each view) using non-linear optimization. The optimization of this example is gradient driven. By the end of the process, the match circuitry 120 produces a refined relative orientation R, which is the second relative orientation. The match circuitry 120 estimates a third calibration value, which also is known as an estimated calibration value, based on the second relative orientation R and the second calibration value.

The depth circuitry 122 models the relative orientations. For example, the depth circuitry 122 uses an iterative process that seeks to maximize the goodness of depth (e.g., a fill factor) by trying different relative orientation values while configuring the depth estimation engine 130. The goodness of depth is the quality of the depth estimation that may be expressed by the fill factor. The fill factor is the ratio of pixels for which the depth estimation is considered reliable. The goodness of depth modeling determines discrepancies between observed values and values expected under the model. The depth circuitry updates the third calibration value based on the relative orientations to a fourth calibration value, which also may be known as a refined calibration value.

The scene analysis circuitry 124 calculates safety indicators. For example, the scene analysis circuitry 124 provides a set of indicators that measure global scene characteristics. The scene analysis circuitry 124 uses scaled-down version of the left frame, along with a scaled-down disparity map. Example indicators that are calculated include local contrast, median disparity, and planarity.

Local contrast is indicative of a number of details in a scene. Median disparity is indicative of a distance of the scene. The distance of a scene is a typical distance between the stereo pair (cameras) and the objects in the scene. For example, the distance of a scene can include an average distance from the camera to one or more objects in front of the camera. Planarity measures how much the scene resembles a single plane (e.g., how close the scene is to having all objects in a same plane). Planarity may be measured by fitting a plane to disparity values and using goodness-of-fit.

The match circuitry 120 also calculates additional indicators. In particular, the match circuitry 120 adds match-related safety indicators including, for example, inlier ratio and motion gradient. Inlier ratio is a percentage of good matches used in the final model. Inlier ratio is to indicate the confidence of the models calculated from the set of matches. Motion gradient is the 90th percentile of motion field gradient. Motion gradient is indicative of number of differences between left and right frames.

The safety detection circuitry 126 aggregates some or all of the safety indicators (e.g., local contrast, median disparity, planarity, inlier ratio, motion gradient) into a single decision or safety metric. The safety metric indicates if the fourth calibration value will improve depth estimation, or if the fourth calibration value might deteriorate the quality of the depth estimation. Thus, the safety metric includes a metric indicative of calibration improvement.

To assess if the fourth calibration will improve the quality of the depth estimation, the safety detection circuitry 126 applies a sigmoid function to one, more, or each of the indicators to normalize the indicators. Each sigmoid has a form:

$$s(i) = \frac{1}{1 + \exp(-k(i) * (\text{indicator } (i) - th(i)))}$$

where the k(i), th(i) are parameters for i-th indicator (from the set above). The indicator (i) denotes all the indicators defined previously, for example: {local contrast, median disparity, planarity, inlier ratio, motion gradient}. The k(i), th(i) are tuning parameters used to achieve the required calibration reliability.

The safety detection circuitry 126 trims each result of a sigmoid to remain within [low(i), high(i)] range. The range is tuned based on performance aims. The safety detection circuitry 126 combines the results using weighted average:

$$\text{Safety} = \sum_i s(i) * w(i)$$

where s(i) and w(i) are tuning parameters.

In some examples, to set all the parameters used by the safety detection circuitry 126, the example system 100 is trained on a large set of various real-world scenes. Example scenes includes well-lit and low-lit scenes, textured and texture-less surfaces, office-like and production-floor-like scenes, etc. In some examples, the system 100 also is trained to target three precision levels: basic, medium, and high. In other examples, the system 100 is trained for other amounts of precision levels. In these examples, the result of the training is a set of block parameters (k, th, low, high, w), that are later used as presets.

The update circuitry 128 determines if the fourth calibration value is safe. For example, the update circuitry 128 uses the fourth calibration value, the Kalman filter state, and the safety metric to decide if the fourth calibration value is safe to accept. The update circuitry 128 compares the safety metric to a threshold. If the safety metric satisfies the threshold, the update circuitry 128 determines a fifth calibration value, also known as an updated calibration value. The fifth calibration value is based on the fourth calibration value and an updated Kalman filter state. The update circuitry 128 pushes the fifth calibration value to the depth estimation engine 130. The depth estimation engine 130 provides a depth map for a pair of stereo images based on the fifth calibration value. The fifth calibration value may be stored in the database 132 and used as the first calibration value in a subsequent calibration process.

If the safety metric does not satisfy the threshold, the update circuitry 128 rejects the fourth calibration value, which results in no change in the depth estimation engine configuration. The Kalman filter state is updated accordingly.

In some examples, the threshold is configurable. In some examples, the threshold is based on one or more acceptance levels that depend on the desired precision and strictness of the calibration. In some examples, the safety threshold is tuned to be conservative enough to not damage a good calibration. On the other hand, in some examples, the threshold is set to accept enough calibrations to achieve re-calibration when needed.

Figure 4:
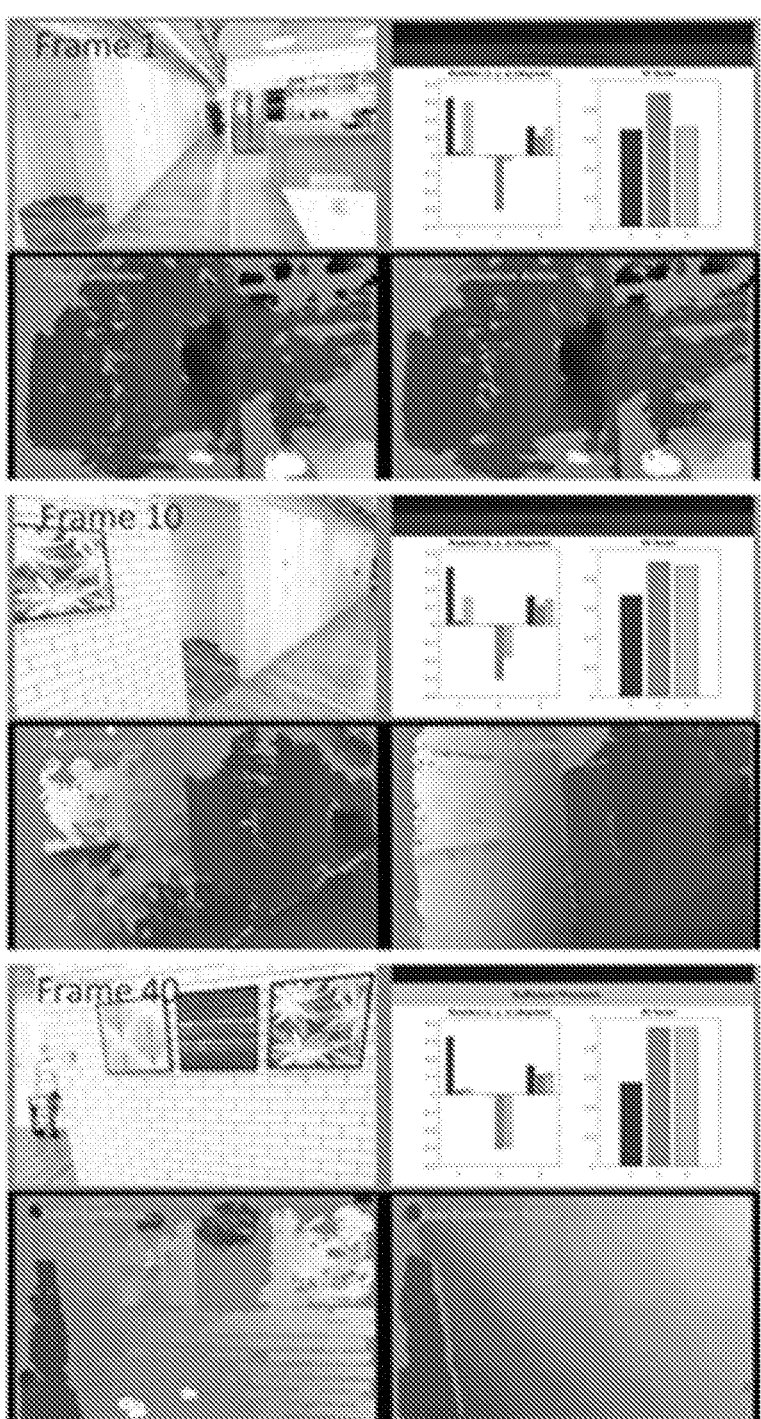
FIG. 4 is a group of example images showing calibration convergence in accordance with teachings of this disclosure.

FIG. 4 is a group of example images showing calibration convergence in accordance with the teachings of this disclosure. The example of FIG. 4 shows a performance of the autonomous calibration system in a real-world scenario. In this example, a stereo camera was calibrated in a lab, which serves as a comparison point. Mechanical shock was emulated by introducing rotation deviation of 0.1 degrees around the x axis and the y axis and 0.05 degrees around the z axis. Only one of the cameras was rotated. The rotation degraded calibration is fed as a starting point. The example calibration system of FIG. 4 runs on 50 frames of a continuous video.

The frames shown in FIG. 4 are taken from a single calibration process. The camera being calibrated is handheld and is slowly rotated from right to left. In the calibration, a very low framerate is used to make the scene more different. This demonstrates the ability to calibrate when the scene is not static. Initially, the camera is positioned facing directly toward a room in the distance. This is the input frame shown in the top left of FIG. 4. There is improper calibration of Frame 1, as shown by the corrupted depth map, which appears in the second row on the left, below Frame 1. Towards the middle of the sequence the camera is rotated towards the wall, which is shown in Frame 10. The calibration starts to fix the depth map, which is shown in the frame in the fourth row on the left below Frame 10 and on the right. As the calibration continues, the camera is pointed toward the wall to the left, which is shown in Frame 40. The calibration process continues, and the depth map is fixed within a required and/or desired precision, as illustrated in the depth map, which appears in the sixth row on the right.

Figure 5:
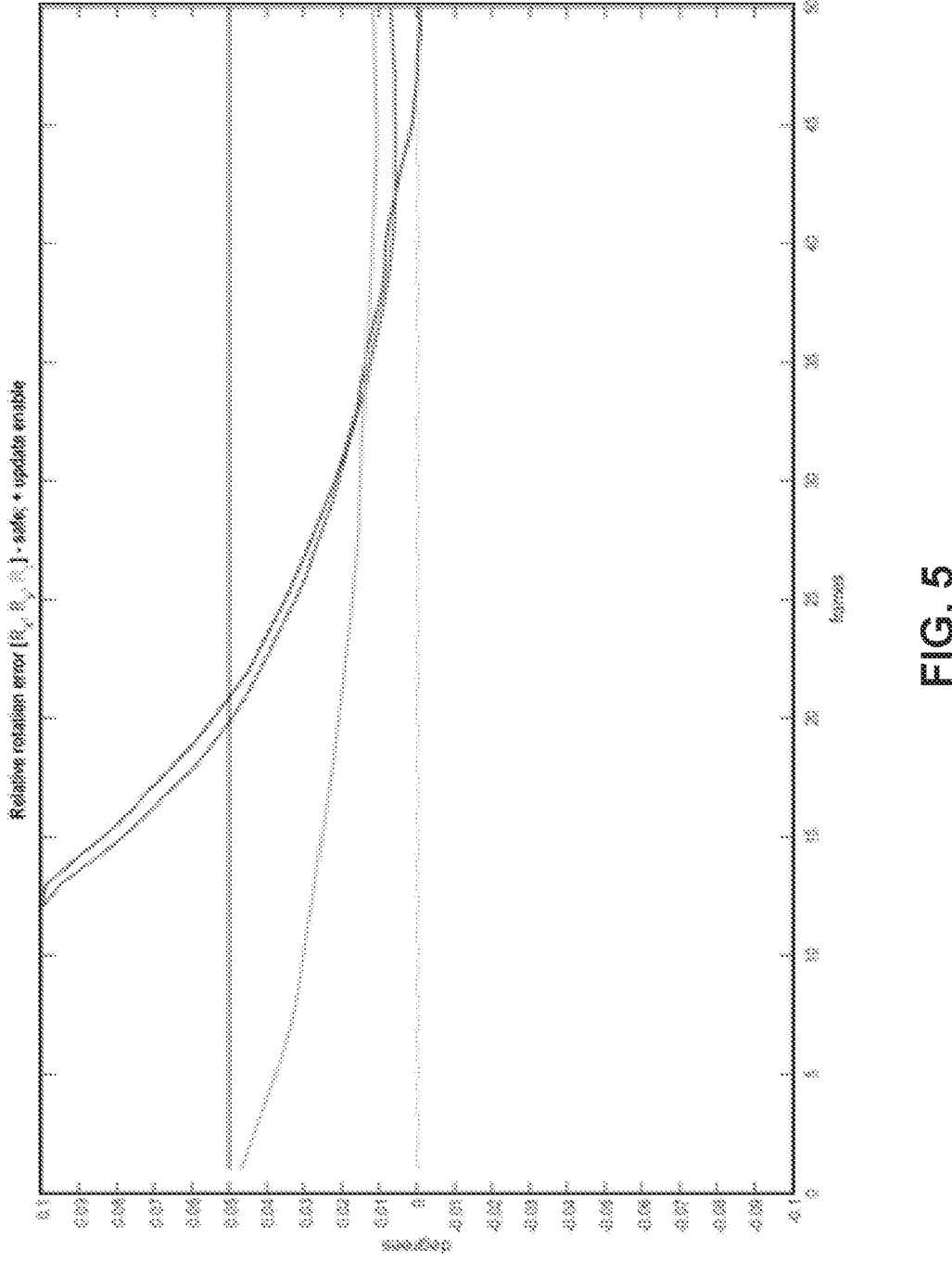
FIG. 5 is an example graph showing calibration convergence in accordance with teachings of this disclosure.

FIG. 5 is an example graph showing calibration convergence in accordance with the teachings of this disclosure.

FIG. 5 shows an evolution of the rotation error between the cameras (relatively to an ideal calibration) over 50 frames. The rotation errors around x, y axis (vertical and horizontal) gradually converge to about 0.01 degree with the initial error being at 0.1 degree.

FIG. 1 is a block diagram of an IPU 104 to autonomously calibrate a stereo camera. The IPU 104 of FIG. 1 may be instantiated (e.g., creating an instance of, bring into being for any length of time, materialize, implement, etc.) by processor circuitry such as a central processing unit executing instructions. Additionally or alternatively, the IPU 104 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

Figure 6B:
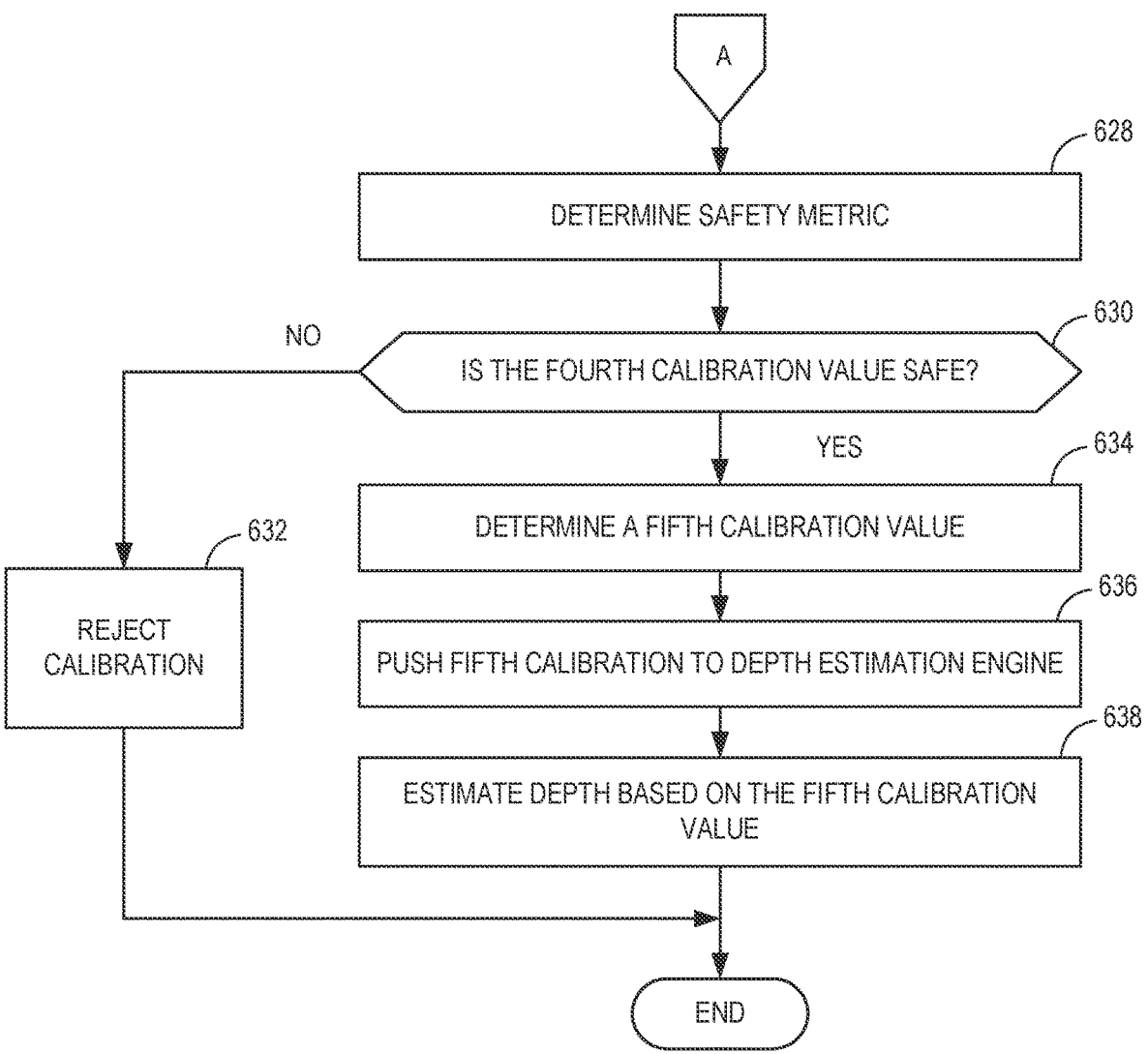

In some examples, the motion grid circuitry 114 is instantiated by processor circuitry executing motion grid instructions and/or operations such as those represented by the flowcharts of FIGS. 6A, 6B, and/or 7. In some examples, the calibration circuitry 116 is instantiated by processor circuitry executing calibration instructions and/or operations such as those represented by the flowcharts of FIGS. 6A, 6B, and/or 7. In some examples, the prediction circuitry 118 is instantiated by processor circuitry executing prediction instructions and/or operations such as those represented by the flowcharts of FIGS. 6A, 6B, and/or 7. In some examples, the match circuitry 120 is instantiated by processor circuitry executing matching instructions and/or operations such as those represented by the flowcharts of FIGS. 6A, 6B, and/or 7. In some examples, the depth circuitry 122 is instantiated by processor circuitry executing depth instructions and/or operations such as those represented by the flowcharts of FIGS. 6A, 6B, and/or 7. In some examples, the scene analysis circuitry 124 is instantiated by processor circuitry executing scene analysis instructions and/or operations such as those represented by the flowcharts of FIGS. 6A, 6B, and/or 7. In some examples, the safety detection circuitry 126 is instantiated by processor circuitry executing safety detection instructions and/or operations such as those represented by the flowcharts of FIGS. 6A, 6B, and/or 7. In some examples, the update circuitry 114 is instantiated by processor circuitry executing updating instructions and/or operations such as those represented by the flowcharts of FIGS. 6A, 6B, and/or 7.

In some examples, the apparatus includes means for determining a motion grid. For example, the means for determining may be implemented by the motion grid circuitry 114. In some examples, the motion grid circuitry 114 may be instantiated by processor circuitry such as the example processor circuitry 812 of FIG. 8. For instance, the motion grid circuitry 114 may be instantiated by the example microprocessor 900 of FIG. 9 executing machine executable instructions such as those implemented by at least blocks 606 and 608 of FIG. 6 and/or 702 of FIG. 7. In some examples, the motion grid circuitry 114 may be instantiated by hardware logic circuitry, which may be implemented by an ASIC, XPU, or the FPGA circuitry 1000 of FIG. 10 structured to perform operations corresponding to the machine readable instructions. Additionally or alternatively, the motion grid circuitry 114 may be instantiated by any other combination of hardware, software, and/or firmware. For example, the motion grid circuitry 114 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining a calibration value. For example, the means for determining may be implemented by the calibration circuitry 116. In some examples, the calibration circuitry 116 may be instantiated by processor circuitry such as the example processor circuitry 812 of FIG. 8. For instance, the calibration circuitry 116 may be instantiated by the example microprocessor 900 of FIG. 9 executing machine executable instructions such as those implemented by at least blocks 602, 604, and 610—of FIGS. 636 and/or 704-710 of FIG. 7. In some examples, the calibration circuitry 116 may be instantiated by hardware logic circuitry, which may be implemented by an ASIC, XPU, or the FPGA circuitry 1000 of FIG. 10 structured to perform operations corresponding to the machine readable instructions. Additionally or alternatively, the calibration circuitry 116 may be instantiated by any other combination of hardware, software, and/or firmware. For example, the calibration circuitry 116 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the IPU 104 is illustrated in FIG. 1, one or more of the elements, processes, and/or devices illustrated in FIG. 1 may be combined, divided, re-arranged, omitted, eliminated, and/or implemented in any other way. Further, the example motion grid circuitry 114, the example calibration circuitry 116, the example prediction circuitry 118, the example match circuitry 120, the example depth circuitry 122, the example scene analysis circuitry 124, the example safety detection circuitry 126, the example update circuitry 128, and/or, more generally, the example IPU 104 of FIG. 1, may be implemented by hardware alone or by hardware in combination with software and/or firmware. Thus, for example, any of the example motion grid circuitry 114, the example calibration circuitry 116, the example prediction circuitry 118, the example match circuitry 120, the example depth circuitry 122, the example scene analysis circuitry 124, the example safety detection circuitry 126, the example update circuitry 128, and/or, more generally, the example IPU 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example IPU 104 of FIG. 1 may include one or more elements, processes, and/or devices in addition to, or instead of, those illustrated in FIG. 1, and/or may include more than one of any or all of the illustrated elements, processes and devices.

Figure 7:
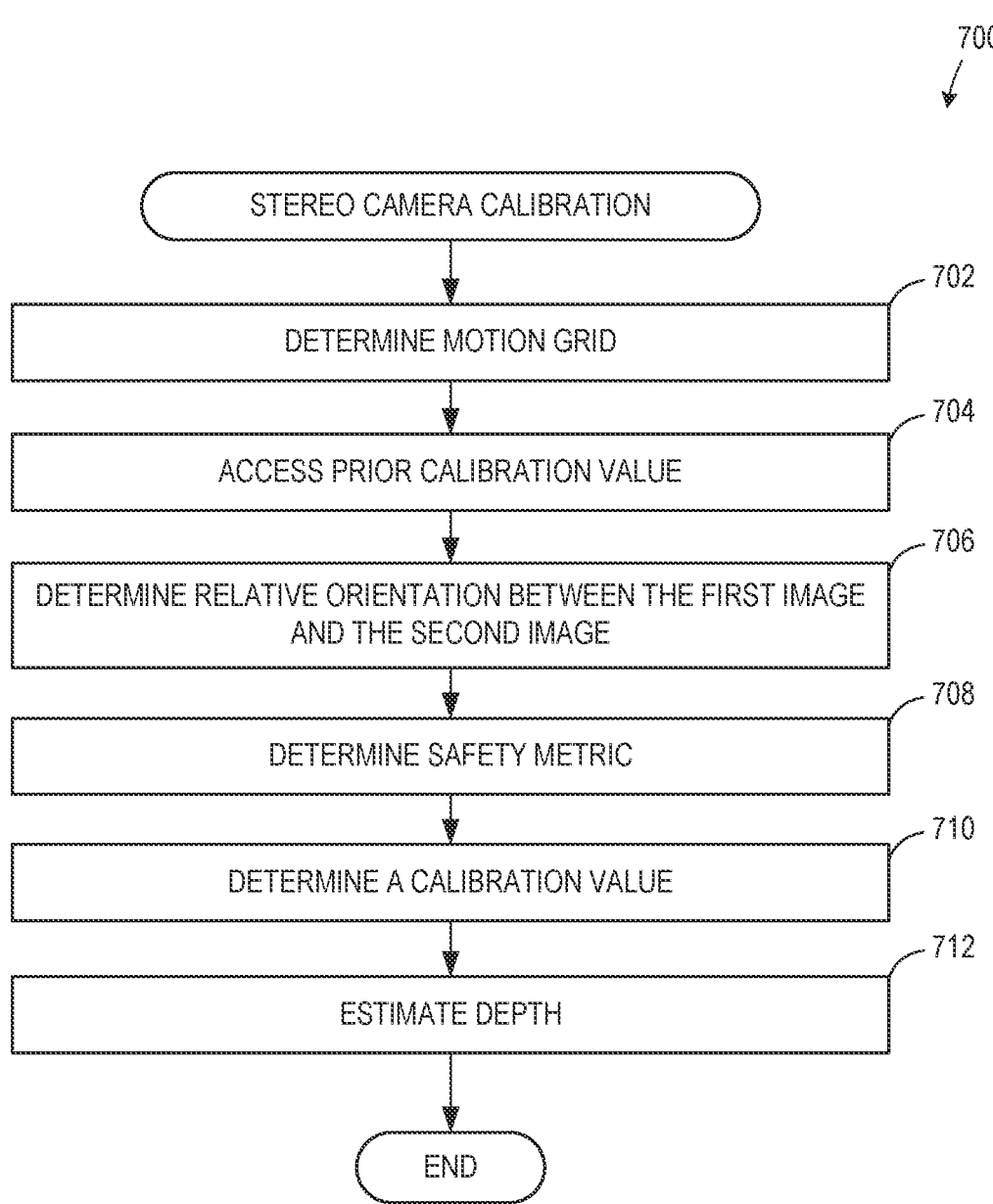
FIG. 7 is a flowchart representative of example machine readable instructions and/or example operations that may be executed and/or implemented by example processor circuitry to implement the example calibration system of FIG. 1.

Flowcharts representative of example machine readable instructions, which may be executed to configure processor circuitry to implement the IPU 104 of FIG. 1, are shown in FIGS. 6A, 6B, and 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. ^A, 6B, and 7, many other methods of implementing the example IPU 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6A, 6B, and 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read-only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIGS. 6A and 6B is a flowchart representative of example machine readable instructions and/or example operations 600 that may be executed and/or instantiated by processor circuitry to autonomously calibrate a stereo camera. The machine readable instructions and/or the operations 600 of FIGS. 6A and 6B include the prediction circuitry 118 accessing or otherwise obtaining a first calibration value (block 602). The first calibration value may be, for example, a previous calibration value obtained from a prior implementation of the operations 600. The prediction circuitry 118 estimates a second calibration value based on the first calibration value and a time series and signal processing analysis including, for example, a Kalman filter (block 604). The second calibration value also may be known as a preliminary calibration value.

The motion grid circuitry 114 obtains or accesses synchronized left and right images (block 606). The motion grid circuitry 114 computes a motion field or motion grid between the left and right images (block 608).

The match circuitry 120 extracts matching points between the left and right frames from the motion grid (block 610). The match circuitry 120 obtains a first relative orientation between frames of the stereo camera (block 612). For example, the match circuitry 120 leverages the epipolar geometry model. The match circuitry 120 determines a second relative orientation (block 614). For example, the match circuitry 120 determines the second relative orientation based on the first relative orientation and bundle adjustment modeling. The match circuitry 120 estimates a third calibration value (block 616). For example, the match circuitry 120 estimates the third calibration value, which also may be known as an estimated calibration value, based on the second relative orientation and the second calibration value.

The depth circuitry 122 models the relative orientations (block 618). For example, the depth circuitry 122 uses goodness of depth modeling to model the relative orientations. The depth circuitry 122 produces depth estimates using the model (block 620). The depth circuitry 122 estimates a fourth calibration value (block 622). For example, the depth circuitry 122 updates the third calibration value based on the relative orientations to the fourth calibration value, which also may be known as a refined calibration value.

The scene analysis circuitry 124 and the match circuitry 120 calculate safety indicators (block 624). For example, the scene analysis circuitry 124 calculates one or more of local contrast, median disparity, and/or planarity. In addition, the match circuitry 120 calculates one or more of inlier ratio and/or motion gradient. Inlier ratio is a percentage of good matches used in the final model.

The safety detection circuitry 126 aggregates some or all of the safety indicators (block 626). The safety detection circuitry 126 determines a safety metric based on the aggregated indicators (block 628).

The update circuitry 128 deter determines if the fourth calibration value is safe (block 630). For example, the update circuitry 128 compares the safety metric to a threshold. If or when the safety metric does not satisfy the threshold, the update circuitry 128 determines that the fourth calibration value is not safe (block 630: NO). The update circuitry 128 then rejects the fourth calibration value (block 632).

If or when the safety metric satisfies the threshold, the update circuitry 128 determines that the fourth calibration value is safe (block 630: YES). Then the update circuitry 128 determines a fifth calibration value, also known as an updated calibration value (block 634). In some examples, the fifth calibration value is based on the fourth calibration value and an updated Kalman filter state. The update circuitry 128 pushes the fifth calibration value to the depth estimation engine 130 (block 636). The depth estimation engine 130 estimates depth in the stereo images based on the fifth calibration value (block 638). The example operations 600 then end.

FIG. 7 is a flowchart representative of example machine readable instructions and/or example operations 700 that may be executed and/or instantiated by processor circuitry to autonomously calibrate a stereo camera. The machine readable instructions and/or the operations 700 of FIG. 7 include the motion grid circuitry determining a motion grid between images from a stereo camera (block 702).

The calibration circuitry 118 accesses a prior calibration value (block 704). The calibration circuitry 118 determines relative orientation between the first image and the second image based on the motion grid (block 706). The calibration circuitry 118 determines a safety metric related to the images (block 708). The calibration circuitry 118 determines a calibration value based on the prior calibration value, the relative orientation between the first and second images, and the safety metric (block 710). The depth estimate engine 130 estimates depth in the images of the stereo camera based on the calibration value (block 712). The example operations 700 then end.

Figure 8:
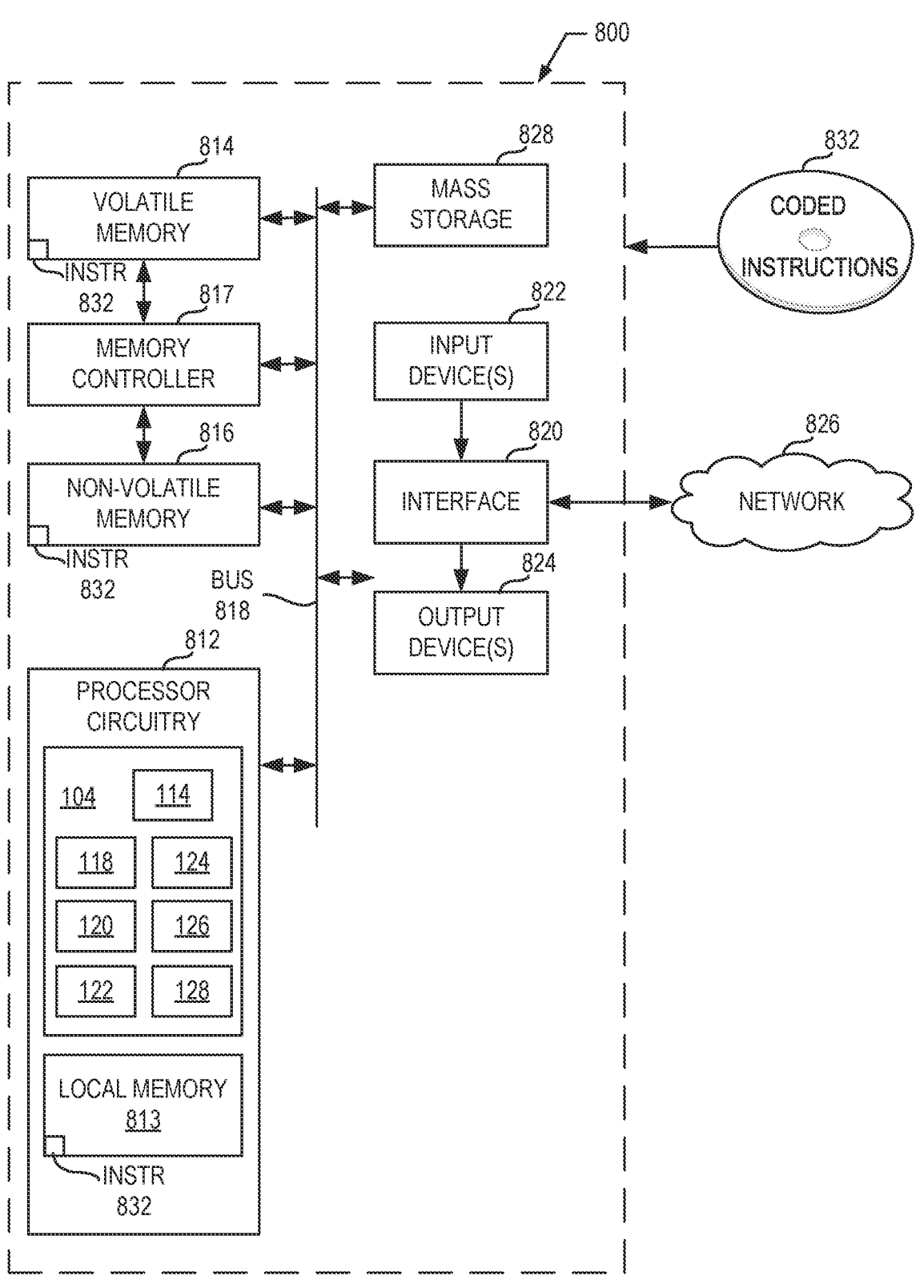
FIG. 8 is a block diagram of an example processing platform including processor circuitry structured to execute and/or implement the example machine readable instructions and/or the example operations of FIGS. 6A, 6B, and 7 to implement the example calibration system of FIG. 1.

FIG. 8 is a block diagram of an example processor platform 800 structured to execute and/or instantiate the machine readable instructions and/or the operations of FIGS. 6A, 6B, and/or 7 to implement the IPU 104 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 412 implements the IPU 104, the motion grid circuitry 114, the calibration circuitry 116, the prediction circuitry 118, the match circuitry 120, the depth circuitry 122, the scene analysis circuitry 124, the safety detection circuitry 126, and the update circuitry 128.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIGS. 6A, 6B, and 7, may be stored in the mass storage device 828, in the volatile memory 814, in the non-volatile memory 816, and/or on a removable non-transitory computer readable storage medium such as a CD or DVD.

Figure 9:
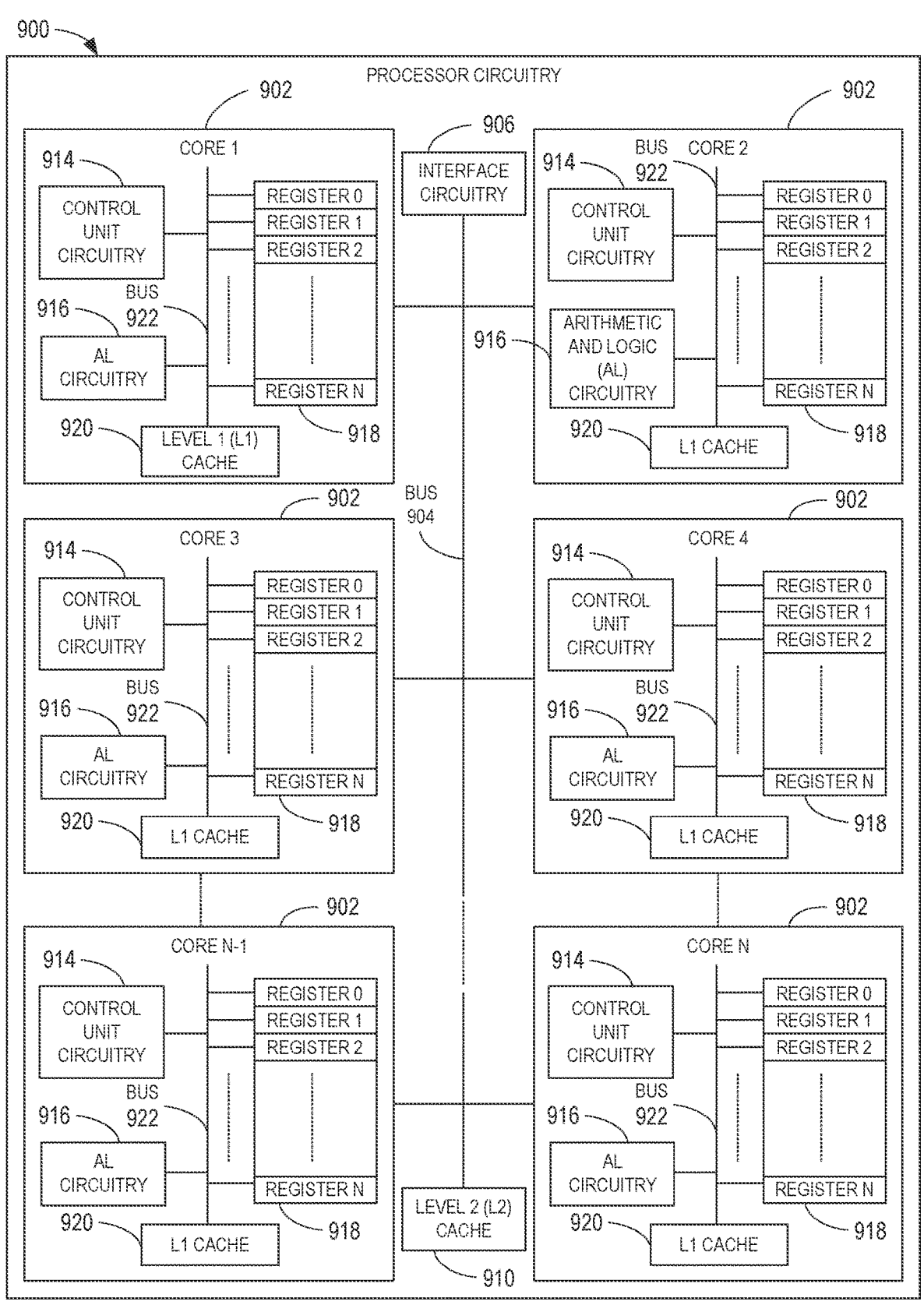
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of FIGS. 6A, 6B, and/or 7 to effectively instantiate the IPU 104 of FIG. 1 as logic circuits to perform the operations corresponding to those machine readable instructions. In some such examples, the PU 104 of FIG. 1 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6A, 6B, and/or 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
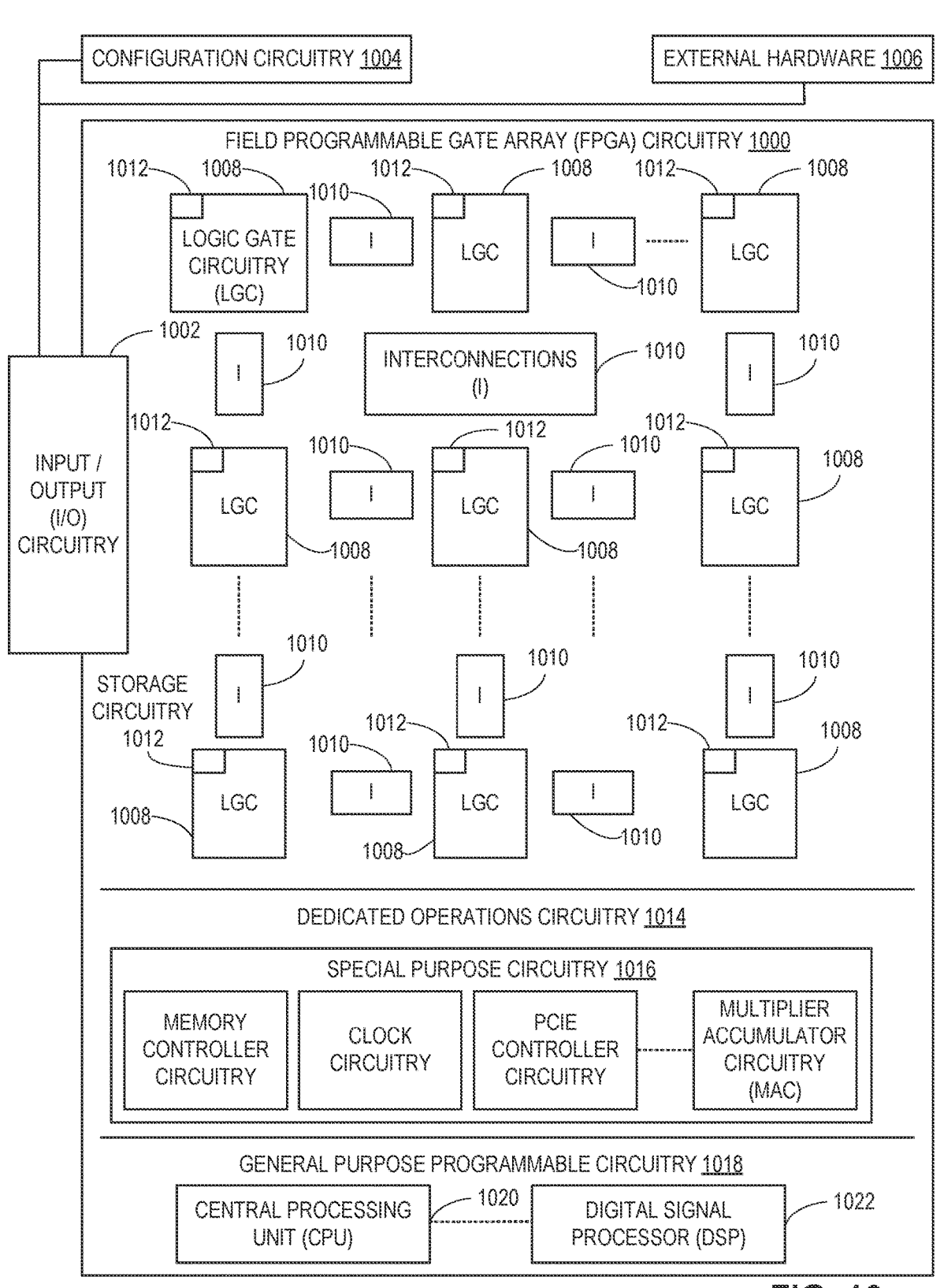
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6A, 6B, and/or 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 6A, 6B, and/or 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6A, 6B, and/or 7. As such, the FPGA circuitry 1000 may be structured to effectively instantiate some or all of the machine readable instructions of the flowcharts of FIGS. 6A,

6B, and/or 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of flowcharts of FIGS. 6A, 6B, and/or 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIGS. 6A, 6B, and/or 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6A, 6B, and/or 7 may be executed by one or more of the cores 902 of FIG. 9, a second portion of the machine readable instructions represented by the flowcharts of FIGS. 6A, 6B, and/or 7 may be executed by the FPGA circuitry 1000 of FIG. 10, and/or a third portion of the machine readable instructions represented by the flowcharts of FIGS. 6A, 6B, and/or 7 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed for autonomous calibration of stereo cameras. Disclosed systems, methods, apparatus, and articles of manufacture improve the efficiency of using a computing device by calibrating and recalibrating stereo cameras to account for mechanical stress and/or thermal variations experienced by these electronic devices. Disclosed systems, methods, apparatus, and articles of manufacture are accordingly directed to one or more improvement(s) in the operation of a machine such as a computer or other electronic and/or mechanical device.

The example systems, apparatus, methods, and articles of manufacture for autonomous stereo camera calibrations provide many benefits. These examples run completely autonomously without human interaction. These examples handle calibration deviations, such as, for example, those originating from mechanical stresses, thermal variations, etc. Examples disclosed herein do not deteriorate the existing camera calibration. Examples disclosed herein achieve lab-grade precision in the calibration. In addition, examples disclosed herein run the calibration with minimal interference with the usual camera operation.

The examples disclosed herein also are beneficial in that the examples do not require the use of calibration target, which is a piece of hardware that must be created and maintained. Also, the examples disclosed herein do not require lab-based calibration and the associated added costs of the calibration procedure. The examples disclosed herein eliminate the need for manual recalibration and are robust enough to run in a production system.

Examples for autonomous calibration of stereo cameras are disclosed herein. Example 1 includes an apparatus to calibrate a stereo camera, the apparatus comprising: at least one memory; machine readable instructions; and processor circuitry to at least one of instantiate or execute the machine readable instructions to: estimate, based on a first calibration value, a second calibration value; extract matching points from a motion field between a first image and a second image from the stereo camera; determine a relative orientation between the first image and the second image based on the matching points; estimate a second calibration value based on a first calibration value and the relative orientation; model a plurality of relative orientations between the first image and the second image to produce depth estimates; estimate a third calibration value based on the second calibration value and the depth estimates; determine a safety metric; determine a fourth calibration value based on the third calibration value and the safety metric; and output the fourth calibration value to calibrate the stereo camera.

Example 2 includes the apparatus of Example 1, wherein the processor circuitry is to estimate the first calibration with a Kalman filter.

Example 3 includes the apparatus of either Examples 1 or 2, wherein the processor circuitry is to determine the relative orientation between the first image and the second image based on an epipolar geometry model.

Example 4 includes the apparatus of Example 3, wherein the processor circuitry is to determine the relative orientation between the first image and the second image based on a bundle adjustment.

Example 5 includes the apparatus of any of Examples 1-4, wherein the processor circuitry is to determine the safety metric based on one or more indicators including: an inlier ratio; a motion gradient; a local contrast; a median disparity; or a planarity.

Example 6 includes the apparatus of Example 5, wherein the processor circuitry is to determine the safety metric based on a sigmoid function of the one or more indicators.

Example 7 includes the apparatus of any of Examples 1-6, wherein the processor circuitry is to: compare the safety metric to a threshold; determine the fourth calibration value when the safety metric satisfies the threshold; and reject the third calibration value when the safety metric does not satisfy the threshold.

Example 8 includes a non-transitory machine readable storage medium comprising instructions that, when executed, cause processor circuitry to at least: estimate, based on a first calibration value, a second calibration value; determine a relative orientation between a first image and a second image from a stereo camera based on a motion grid mapping the first image with the second image; estimate a third calibration value based on the second calibration value and the relative orientation; model a plurality of relative orientations between the first image and the second image to produce depth estimates; estimate a fourth calibration value based on the third calibration value and the depth estimates; determine a metric indicative of calibration improvement;

determine a fifth calibration value based on the fourth calibration value and the metric; and output the fifth calibration value to calibrate the stereo camera.

Example 9 includes the storage medium of Example 8, wherein the instructions cause the processor circuitry to estimate the second calibration with a Kalman filter.

Example 10 includes the storage medium of either Examples 8 or 9, wherein the instructions cause the processor circuitry to determine the relative orientation between the first image and the second image based on an epipolar geometry model.

Example 11 includes the storage medium of Example 10, wherein the instructions cause the processor circuitry to determine the relative orientation between the first image and the second image based on a bundle adjustment.

Example 12 includes the storage medium of any of Examples 8-11, wherein the instructions cause the processor circuitry to determine the metric based on: an inlier ratio; a motion gradient; a local contrast; a median disparity; and a planarity.

Example 13 includes the storage medium of Example 12, wherein the instructions cause the processor circuitry to determine the metric based on a sigmoid function of the indicators.

Example 14 includes the storage medium of any of Examples 8-13, wherein the instructions cause the processor circuitry to: compare the metric to a threshold; determine the fifth calibration value when the metric satisfies the threshold; and reject the fourth calibration value when the metric does not satisfy the threshold.

Example 15 includes an apparatus to calibrate a stereo camera, the apparatus comprising: means for determining a motion grid between a first image and a second image captured by the stereo camera; means for determining a calibration value to calibrate the stereo camera based on: a prior calibration value; a relative orientation between the first image and the second image based on the motion grid; and a metric indicative of calibration improvement; and means for estimating a depth based on the calibration value.

Example 16 includes the apparatus of Example 15, wherein the means for determining the calibration value is to determine the relative orientation between the first image and the second image with an epipolar geometry model and a bundle adjustment.

Example 17 includes the apparatus of either Examples 15 or 16, wherein the means for determining the calibration value is to determine the metric based on indicators including: an inlier ratio; a motion gradient; a local contrast; a median disparity; and a planarity.

Example 18 includes the apparatus of Example 17, wherein the means for determining the calibration value to determine the metric based on a sigmoid function of the one or more indicators.

Example 19 includes the apparatus of any of Examples 15-18, wherein the means for determining the calibration value is to: compare the metric to a threshold; determine the calibration value when the metric satisfies the threshold; and reject the calibration value when the metric does not satisfy the threshold.

Example 20 includes a non-transitory machine readable medium comprising: motion grid instructions to cause at least one machine to determine a motion grid between a first image and a second image captured by a stereo camera; calibration instructions to cause at least one machine to determine a calibration value to calibrate the stereo camera based on: a prior calibration value; a relative orientation between the first image and the second image based on the motion grid; and a safety metric; and depth estimate instructions to cause at least one machine to estimate a depth based on the calibration value.

Example 21 includes the medium of Example 20, wherein the calibration instructions are to cause the at least one machine to determine the relative orientation between the first image and the second image with an epipolar geometry model and a bundle adjustment.

Example 22 includes the medium of either Examples 20 or 21, wherein the calibration instructions are to cause the at least one machine to determine the safety metric based on one or more indicators including: an inlier ratio; a motion gradient; a local contrast; a median disparity; or a planarity.

Example 23 includes the medium of Example 22, wherein the calibration instructions are to cause the at least one machine to determine the safety metric based on a sigmoid function of the one or more indicators.

Example 24 includes the medium of any of Examples 20-23, wherein the calibration instructions are to: compare the safety metric to a threshold; determine the calibration value when the safety metric satisfies the threshold; and reject the calibration value when the safety metric does not satisfy the threshold.

Example 25 includes a method of calibrating a stereo camera, the method comprising: determining, by executing instructions with a processor, a motion grid between a first image and a second image captured by the stereo camera; and determining, by executing instructions with the processor, a calibration value to calibrate the stereo camera based on: a prior calibration value; a relative orientation between the first image and the second image based on the motion grid; and a metric indicative of calibration improvement, the metric based on an inlier ratio, a motion gradient, a local contrast, a median disparity, and a planarity; comparing, by executing instructions with the processor, the metric to a threshold; determining, by executing instructions with the processor, the calibration value when the metric satisfies the threshold; and rejecting, by executing instructions with the processor, the calibration value when the metric does not satisfy the threshold.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to calibrate a stereo camera, the apparatus comprising:
   at least one memory;
   machine readable instructions; and
   processor circuitry to at least one of instantiate or execute the machine readable instructions to:
      estimate, based on a first calibration value, a second calibration value;
      extract matching points from a motion field between a first image and a second image captured by the stereo camera;
      determine a relative orientation between the first image and the second image based on the matching points;
      estimate a third calibration value based on the second calibration value and the relative orientation;
      model a plurality of relative orientations between the first image and the second image to produce depth estimates;

estimate a fourth calibration value based on the third calibration value and the depth estimates;

determine a safety metric;

determine a fifth calibration value based on the fourth calibration value and the safety metric; and output the fifth calibration value to calibrate the stereo camera.

2. The apparatus of claim 1, wherein the processor circuitry is to estimate the second calibration value with a Kalman filter.

3. The apparatus of claim 1, wherein the processor circuitry is to determine the relative orientation between the first image and the second image based on an epipolar geometry model.

4. The apparatus of claim 3, wherein the processor circuitry is to determine the relative orientation between the first image and the second image based on a bundle adjustment.

5. The apparatus of claim 1, wherein the processor circuitry is to determine the safety metric based on one or more indicators including:

an inlier ratio;

a motion gradient;

a local contrast;

a median disparity; or a planarity.

6. The apparatus of claim 5, wherein the processor circuitry is to determine the safety metric based on a sigmoid function of the one or more indicators.

7. The apparatus of claim 1, wherein the processor circuitry is to:

compare the safety metric to a threshold;

determine the fifth calibration value when the safety metric satisfies the threshold; and reject the fourth calibration value when the safety metric does not satisfy the threshold.

8. A non-transitory machine readable storage medium comprising instructions that, when executed, cause processor circuitry to at least:

estimate, based on a first calibration value, a second calibration value;

determine a relative orientation between a first image and a second image captured by a stereo camera based on a motion grid mapping the first image with the second image;

estimate a third calibration value based on the second calibration value and the relative orientation;

model a plurality of relative orientations between the first image and the second image to produce depth estimates;

estimate a fourth calibration value based on the third calibration value and the depth estimates;

determine a metric indicative of calibration improvement;

determine a fifth calibration value based on the fourth calibration value and the metric; and output the fifth calibration value to calibrate the stereo camera.

9. The storage medium of claim 8, wherein the instructions cause the processor circuitry to estimate the second calibration value with a Kalman filter.

10. The storage medium of claim 8, wherein the instructions cause the processor circuitry to determine the relative orientation between the first image and the second image based on an epipolar geometry model.

11. The storage medium of claim 10, wherein the instructions cause the processor circuitry to determine the relative orientation between the first image and the second image based on a bundle adjustment.

12. The storage medium of claim 8, wherein the instructions cause the processor circuitry to determine the metric based on one or more indicators including:

an inlier ratio;

a motion gradient;

a local contrast;

a median disparity; or a planarity.

13. The storage medium of claim 12, wherein the instructions cause the processor circuitry to determine the metric based on a sigmoid function of the indicators.

14. The storage medium of claim 8, wherein the instructions cause the processor circuitry to:

compare the metric to a threshold;

determine the fifth calibration value when the metric satisfies the threshold; and reject the fourth calibration value when the metric does not satisfy the threshold.

15. An apparatus to calibrate a stereo camera, the apparatus comprising:

motion grid circuitry configured to compute a motion grid between a first image and a second image captured by the stereo camera;

calibration circuitry configured to output a calibration value to calibrate the stereo camera based on:

a prior calibration value;

a relative orientation between the first image and the second image based on the motion grid; and a metric indicative of calibration improvement; and means for estimating a depth based on the calibration value.

16. The apparatus of claim 15, wherein the calibration circuitry is configured to determine the relative orientation between the first image and the second image with an epipolar geometry model and a bundle adjustment.

17. The apparatus of claim 15, wherein the calibration circuitry is configured to determine the metric based on one or more indicators including:

an inlier ratio;

a motion gradient;

a local contrast;

a median disparity; or a planarity.

18. The apparatus of claim 17, wherein the calibration circuitry is configured to determine the metric based on a sigmoid function of the one or more indicators.

19. The apparatus of claim 15, wherein the calibration circuitry is configured to:

compare the metric to a threshold;

determine the calibration value when the metric satisfies the threshold; and reject the calibration value when the metric does not satisfy the threshold.

20. A non-transitory machine readable medium comprising:

motion grid instructions to cause at least one machine to determine a motion grid between a first image and a second image captured by a stereo camera;

calibration instructions to cause the at least one machine to determine a calibration value to calibrate the stereo camera based on:

a prior calibration value;

a relative orientation between the first image and the second image based on the motion grid; and a safety metric; and depth estimate instructions to cause the at least one machine to estimate a depth based on the calibration value.

21. The medium of claim 20, wherein the calibration instructions are to cause the at least one machine to determine the relative orientation between the first image and the second image with an epipolar geometry model and a bundle adjustment.

22. The medium of claim 20, wherein the calibration instructions are to cause the at least one machine to determine the safety metric based on one or more indicators including:

an inlier ratio;

a motion gradient;

a local contrast;

a median disparity; or a planarity.

23. The medium of claim 22, wherein the calibration instructions are to cause the at least one machine to determine the safety metric based on a sigmoid function of the one or more indicators.

24. The medium of claim 20, wherein the calibration instructions are to cause the at least one machine to:

compare the safety metric to a threshold;

determine the calibration value when the safety metric satisfies the threshold; and reject the calibration value when the safety metric does not satisfy the threshold.

25. A method of calibrating a stereo camera, the method comprising:

determining, by executing instructions with a processor, a motion grid between a first image and a second image captured by the stereo camera;

determining, by executing instructions with the processor, a calibration value to calibrate the stereo camera based on:

a prior calibration value;

a relative orientation between the first image and the second image based on the motion grid; and a metric indicative of calibration improvement, the metric based on one or more indicators including: an inlier ratio, a motion gradient, a local contrast, a median disparity, or a planarity;

comparing, by executing the instructions with the processor, the metric to a threshold;

determining, by executing the instructions with the processor, the calibration value when the metric satisfies the threshold; and rejecting, by executing the instructions with the processor, the calibration value when the metric does not satisfy the threshold.

\* \* \* \* \*